United States Patent Office 3,549,727
Patented Dec. 22, 1970

3,549,727
POLYMERIC HYDROCARBON RESIN-HY-
DROLYZED ETHYLENE/VINYL ESTER
COPOLYMER BLENDS
John S. Coates, Paul F. Dunion, Jr., and Akira Tsuka-
moto, Wilmington, Del., assignors to E. I. du Pont de
Nemours and Company, Wilmington, Del.
No Drawing. Filed Nov. 30, 1967, Ser. No. 686,806
Int. Cl. C08f 37/18
U.S. Cl. 260—897                      10 Claims

ABSTRACT OF THE DISCLOSURE

Adhesive compositions, having superior peel strength, of a polymeric hydrocarbon resin having a melt index of less than about 1,000 and a hydrolyzed ethylene/vinyl ester (e.g., vinyl acetate) copolymer are disclosed. The hydrolyzed copolymer initially contains about 5–25 mole percent copolymerized vinyl ester and is hydrolyzed to at least about 60 percent.

BACKGROUND OF THE INVENTION

As shown in U.S. Pat. 2,386,347, issued to John R. Roland on Oct. 9, 1945, hydrolyzed ethylene/vinyl ester polymers have been known for quite some time. In particular, these hydrolyzed copolymers have found applications as structural adhesives. In selecting the hydrolyzed copolymers as structural adhesives, consideration has been given to several known properties of the copolymers. Thus, for a hydrolyzed copolymer with a given ethylene content, the copolymer lap-shear strength increases as the degree of hydrolysis is increased, generally reaching a maximum at substantially complete hydrolysis, i.e., about 95 percent or greater. On the other hand, the hydrolyzed copolymer's peel strength attains its maximum value prior to complete hydrolysis; and, in fact, is usually extraordinarily low at substantially complete hydrolysis. Consequently, in adhesive applications where the combination of both high lap-shear strength and high peel strength is required, hydrolyzed ethylene/vinyl ester copolymers have found very limited use.

SUMMARY OF THE INVENTION

However, according to the present invention, there is provided a structural adhesive composition, based on a blend of a hydrolyzed ethylene/vinyl ester copolymer and a polymeric hydrocarbon resin, which displays the unique combination of high lap-shear strength and high peel strength. The composition of the present invention consist essentially of (A) about 1–50 weight percent of a polymeric hydrocarbon resin having a melt index of less than about 1,000 and (B) about 50–99 weight percent of a hydrolyzed ethylene/vinyl ester copolymer which is hydrolyzed to at least about 60 percent and which, prior to hydrolysis, contains about 5–25 mole percent copolymerized vinyl ester and 75–95 mole percent copolymerized ethylene.

DESCRIPTION OF THE INVENTION

The particular source of the hydrolyzed ethylene/vinyl ester copolymer useful in the present invention is not important. As used herein, the term "hydrolyzed copolymer" refers generally to those products wherein a portion or all of the initial vinyl ester groups in the copolymer have been converted to vinyl alcohol groups, irrespective of the particular conversion technique used, e.g., alcoholysis, saponification, or hydrolysis. Consequently, the hydrolyzed copolymers useful in this invention contain, in addition to ethylene groups, vinyl alcohol groups and, optionally, unhydrolyzed vinyl ester groups. Also, the copolymers can contain minor amounts of other copolymerized monomers, such as ethylenically unsaturated carboxylic acids. In the present invention, the term "vinyl ester" refers to the vinyl esters of a wide variety of monocarboxylic acids. Among others, examples of useful vinyl esters include vinyl formate, vinyl acetate, vinyl propionate, vinyl butyrate, vinyl stearate, vinyl benzoate, vinyl cyclohexanoate, etc. Lower vinyl esters as illustrated by the first four of the above examples, are preferred, with vinyl acetate being especially preferred. The aforementioned U.S. Pat. 2,386,347 and U.S. Pat. 3,344,129 to Bestian et al. are among the many patents and publications which describe methods of preparing useful partially or completely hydrolyzed ethylene/vinyl ester copolymers.

Both the vinyl ester content of the initial ethylene/vinyl ester copolymer and the degree to which the copolymer is hydrolyzed influence the lap-shear and peel properties of the composition of the present invention. Useful hydrolyzed copolymers are prepared from precursor ethylene/vinyl ester copolymers containing about 5–25 mole percent copolymerized vinyl ester and about 75–95 mole percent copolymerized ethylene. With respect to these precursor copolymers, it has been noted that as their degree of hydrolysis is increased, their lap-shear strength is progressively increased. On the other hand, it has also been noted that as the degree of hydrolysis of these precursor copolymers is increased, the peel strength does not progressively increase as a function of degree of hydrolysis, but rather attains a maximum at somewhere between about 15 and 70 percent hydrolysis and then falls off to considerably lower values. The degree of hydrolysis at which the maximum peel strength is attained is dependent on the particular precursor copolymer. The following table illustrates the lap-shear strength and peel strength behavior, as a function of hydrolysis, for various precursor ethylene/vinyl acetate copolymers useful in the present invention.

TABLE I

| Mole percent vinyl acetate in precursor copolymer | Melt index of precursor [a] | Percent hydrolysis | Lap-shear strength, p.s.i.[b] | Peel strength, p.l.i.[b] |
|---|---|---|---|---|
| 18 | 55 | 0 | 500 | 13 |
| 18 | 55 | 26 | 800 | 15 |
| 18 | 55 | 40 | 1,100 | 15 |
| 18 | 55 | 60 | 1,700 | 18 |
| 18 | 55 | 99 | 2,800 | 4 |
| 10 | 2 | 0 | 800 | 9 |
| 10 | 2 | 17 | 1,000 | 19 |
| 10 | 2 | 60 | 1,700 | 30 |
| 10 | 2 | 99 | 1,900 | 4 |
| 6 | 2.5 | 0 | 950 | 7 |
| 6 | 2.5 | 25 | 1,000 | 11 |
| 6 | 2.5 | 41 | 1,000 | 12 |
| 6 | 2.5 | 99 | 1,400 | 2 |
| 14 | 6 | 0 | 550 | 11 |
| 14 | 6 | 20 | 800 | 22 |
| 14 | 6 | 57 | 1,200 | 12 |
| 14 | 6 | 71 | 1,300 | 7 |
| 14 | 6 | 99 | 1,300 | 2 |

[a] According to ASTM D-1238 (Condition E).
[b] Measured as described in Example I.

As illustrated by the above table, the degree to which a particular precursor copolymer must be hydrolyzed to give the maximum lap-shear strength does not coincide with the degree of hydrolysis necessary to give the maximum peel strength. It is with respect to this phenomenon that the present invention is concerned. Accordingly, it has been discovered that by adding a polymeric hydrocarbon resin to the above precursor ethylene/vinyl ester copolymers, which have been hydrolyzed at least 60 percent, compositions are provided which have a combined high lap-shear and peel strength. Thus, it has been found that, with respect to lap-shear strength, the compositions of the present invention compare favorably with the lap-shear strength of the hydrolyzed copolymer itself. On the other hand, the peel strength of the present compositions is unexpectedly superior to that of the hydrolyzed copolymer alone. In fact, for many of the present compositions, not only is the peel strength greater than that of the hydrolyzed copolymer itself, but is even greater than the maximum peel strength shown by the particular ethylene/vinyl ester copolymer itself at that degree of hydrolysis which gives rise to its maximum value. This latter phenomenon is particularly evident when the precursor ethylene/vinyl ester copolymer contains 12–25 mole percent, and preferably 16.5–19 mole percent, copolymerized vinyl ester and is subsequently hydrolyzed to at least 75 percent, and preferably substantially completely hydrolyzed, i.e., greater than 95 percent.

In the present invention, the percent of hydrolysis refers to the percent of the vinyl ester groups which have been hydrolyzed, based on the total number present initially, and can be measured as follows: Initially, a 1.00 g. sample of the hydrolyzed copolymer is dissolved in 50 ml. of xylene and, thereafter, 100 ml. of a 1:1:1 mixture of methanol-xylene-pyridine is added. Ten ml. of a N solution of sodium hydroxide is then added to the solution and it is refluxed for four hours after which it is cooled and back-titrated with a 0.500 N solution of toluene sulfonic acid in pyridine using metacresol purple as an indicator. A blank sample containing no copolymer is also run in a similar fashion. Subsequently, the weight percent of vinyl ester (VE) in the hydrolyzed copolymer is calculated by using the following formula:

Percent VE = [Blank Titre (ml.) − Sample Titre (ml.)] × 4.3

Thereafter, the percent hydrolysis is determined by converting, by means of an appropriate mathematically constructed calibration curve for the particualr ethylene/vinyl ester copolymer, the calculated weight percent vinyl ester to the corresponding mole percent vinyl ester in the hydrolyzed copolymer, and applying the following formula:

Percent hydrolysis = 100
$$\left(\frac{\text{Mole percent VE (initial)} - \text{Mole percent VE (final)}}{\text{Mole percent VE (initial)}}\right)$$

The molecular weight, as indicated by melt index, of the hydrolyzed ethylene/vinyl ester copolymer also influences the blend's adhesive properties. In this respect, very low molecular weight (high melt index) copolymers are to be avoided. Correspondingly, hydrolyzed copolymers with a melt index of less than about 180, and preferably less than about 80, are most suitable for use in the present invention. As used herein, the melt index of the hydrolyzed copolymer is measured according to ASTM D-1238 under Condition E (190° C., 2160 g.) and is reported as the flow rate in grams per ten minutes.

Polymeric hydrocarbon resins useful in the present invention include those having molecular weights corresponding to melt indexes of less than about 1,000, and preferably less than 500. As illustrated in the examples, with some hydrocarbon resins, melt indexes of less than about 20 are especially suitable. Unless otherwise noted, the melt index of the polymeric hydrocarbon is measured under the previously stated conditions for the hydrolyzed copolymer. The lowest value of melt index on the presently useful hydrocarbon resins is not especially important and, correspondingly, very high molecular weight materials can be used, i.e., those with melt indexes of less than 0.4.

Examples of polymeric hydrocarbons useful in the present invention include polymeric alpha-olefins such as linear polyethylene, branched polyethylene, amorphous and isotactic polypropylene, polybutene, polyisobutylene, etc.; ethylene/alpha-olefin copolymers such as those of ethylene/propylene, ethylene/butene, ethylene/2-methyl-1-butene, ethylene/hexene, ethylene/n-octene, etc.; polymeric alpha-olefins and ethylene/alpha-olefin copolymer rubbers containing minor amounts of other copolymerized monomers such as butadiene, 1,4-hexadiene, etc.; polymerized aromatic hydrocarbons such as polystyrene, poly-alpha-methylstyrene, polyvinyl toluene, etc.; aromatic hydrocarbon copolymers such as those of ethylene/styrene, propylene/styrene, vinyl toluene/alpha-methylstyrene, acrylonitrile/styrene, butadiene/styrene, etc.; and non-aromatic cyclic hydrocarbon polymers such as polyterpenes, etc. Mixtures of useful polymeric hydrocarbon resins can also be used. Additionally, the resins can contain customary substituent groups. The methods of preparing useful polymeric hydrocarbons are well known and the particular source from which they are obtained for use in the present invention is not important.

While, as discussed above, the properties of the present composition are influenced by a variety of factors, the improved strength properties, and particularly the unexpected increase in peel strength, are also dependent on the respective amounts of polymeric hydrocarbon and hydrolyzed copolymer employed. In general, the polymeric hydrocarbon must be present in an amount sufficient to raise the peel strength of the composition above that of the hydrolyzed copolymer alone and not lead to a composition with unacceptable lap-shear strength. Amounts of polymeric hydrocarbon resin in excess of about 50 percent, based on the combined hydrocarbon resin, hydrolyzed copolymer weight, are avoided while, in general, at least 1 percent is used. Accordingly, compositions of the present invention consist essentially of about 1–50 weight percent of polymeric hydrocarbon and about 50–99 weight percent of hydrolyzed copolymer. Preferred compositions which exhibit especially superior peel strengths depend on the particular hydrocarbon used though, in most instances, they contain about 10–30 weight percent polymeric hydrocarbon and 70–90 weight percent of the previously indicated preferred hydrolyzed copolymer.

The present composition can be simply prepared by blending together the hydrolyzed copolymer and the polymeric hydrocarbon by any of a variety of known blending techniques, e.g., physically blending granular materials, melt blending, etc. Most conveniently, blending is accomplished at a temperature at which the ingredients become fusible and flow easily, generally about 125–200° C., using a customary rubber mill, calendar, or extruder. When using these machines, the adhesive composition is obtained in a form (bead, ribbon, film, etc.) in which it can conveniently be distributed between the surfaces to be bonded. Irrespective of the method of blending, adhesive bonding is usually accomplished at elevated temperatures of about 125–225° C., preferably 150–210° C., and under pressures of greater than about 100 p.s.i.

The present adhesive composition is useful in bonding a wide variety of materials. While particularly suitable as a structural adhesive for metal members, it can also be used in bonding other materials, such as polymeric films, metal foils, leather and cellulosic surfaces, etc. Additionally, other ingredients known in the adhesive art, such as those that modify, among others, tack, adhesion, or flexibility characteristics, can be added to the present composition in major or minor amounts. Such ingredients include, among others, waxes, tackifying resins and rosins, plasticizers, stabilizers, etc.

The following examples illustrate the invention. Except for the specified degrees of hydrolysis, all parts and percentages are by weight unless otherwise indicated.

Example 1

A blend was prepared of 20 parts isotactic polypropylene ("Profax" 6523—Melt index of 4; 230° C., 3800 g.) and 80 parts of a 30 melt index, 99% hydrolyzed ethylene/vinyl acetate copolymer initially having 18 mole percent vinyl acetate and 82 mole percent ethylene. The blend was obtained by milling the ingredients on a 2″ x 6″ rubber mill (Getty Machine & Mold, Inc.) at a temperature of 175° C. for about 15 minutes.

In order to test for lap-shear and peel strengths, 1″ x 3″ Alclad aluminum coupons and 8″ x 8″ aluminum sheets were cleaned as follows: The coupons and sheets were cleaned with acetone, degreased in Perclene® [1] perchloroethylene vapor for 5 minutes, and etched for 1 hours at 70° C. in a solution of 1 part $Na_2Cr_2O_7 \cdot 2H_2O$, 10 parts conc. $H_2SO_4$, 30 parts $H_2O$. Thereafter, they were rinsed in water and dried in an oven at 100° C. for 15 minutes.

Dry lap-shear strength was tested by placing on the lower ½″ of a cleaned coupon, 0.1 gram of the Example 1 blend and then placing another coupon on top with a ½″ overlap. Five mil shims were used to obtain about a 5 mil glueline thickness. Subsequently, the coupons were bonded at 180° C. and 300 p.s.i. for 10 minutes. Thereafter, the coupons were allowed to stand at room temperature for 24 hours. The steamed lap-shear strength value was then obtained by using an Instron tester at a crosshead speed of 0.02 inch/minute. The Example 1 composition exhibited a lap-shear strength of 1570 p.s.i. Also, substantially no decrease in shear strength was observed when, prior to testing, a similarly prepared coupon was steamed over boiling water for 24 hours.

Peel strength was tested by bonding together, as in the lap-shear test, 6″ x 8″ portions of two 8″ x 8″ sheets with 1.5 grams of adhesive. The edges of the sheets were trimmed and the sheets were then cut into ½″ strips and the strips tested on an Instron tester using a crosshead speed of 2 inches/minute. The Example 1 composition exhibited an average peel strength of 23 pounds/lineal inch (p.l.i.) (six samples). Additionally, after steaming similar samples, the average peel strength was still 8 p.l.i. For comparative purposes, the dry peel strength of the hydrolyzed copolymer of Example 1 was tested without the polypropylene addition and found to be only about 4 p.l.i. Similarly, the peel strength of isotactic polypropylene alone is about zero.

[1] Registered trademark of E. I. du Pont de Nemours & Company.

Table 2 illustrates further compositions of the present invention. These compositions were formulated and the peel strength tested as in Example 1, except that the isotactic polypropylene was replaced by the designated polymeric hydrocarbon resin. Each of the designated hydrocarbon resins itself has a peel strength of about zero and the blend lap-shear strengths are about the same as that of the Example 1 blend.

TABLE II.—POLYMERIC HYDROCARBON BLENDS WITH 99% HYDROLYZED ETHYLENE/VINYL ACETATE COPOLYMER OF EXAMPLE 1, 20% POLYMERIC HYDROCARBON, 80% HYDROLYZED COPOLYMER

| Ex. | Polymeric hydrocarbon | Melt index | Peel strength (p.l.i.) |
|---|---|---|---|
| 2 | Polyethylene (branched) | 1.9 | 17 |
| 3 | do | 100 | 22 |
| 4 | do | 400 | 27 |
| 5 | Polyethylene (linear) | 3 | 15 |
| 6 | do | 6 | 14 |
| 7 | do | 16.5 | 19 |
| 8 | Propylene/ethylene (2-10 wt. percent ethylene) | 6.5 | 25 |
| 9 | Ethylene/1-butene (24.6 wt. percent butene) | 7.2 | 20 |
| 10 | Ethylene/n-octene (30.5 wt. percent octene) | 8.9 | 15 |
| 11 | Ethylene/propylene/1,4-hexadiene (34 wt. percent propylene, 2.7 wt. percent 1,4-hexadiene). | .4 | 16 |
| 12 | Ethylene/propylene (35 wt. percent propylene). | .1 | 30 |
| 13 | Polystyrene | 2 | 28 |
| 14 | Polystyrene | 399 | 38 |

Table III illustrates other compositions. The methods of blending and testing for lap-shear and peel strengths were accomplished in manners similar to those described in Example 1. Where results are not reported, the measurements were not made; however, if made, it is felt that, for compositions within the present invention, they would compare favorably with the other compositions of this invention wherein the results are reported.

TABLE III

| Example | Polymeric hydrocarbon resin of Example | Percent of hyd. copolymer (a) in blend | Lap-shear (p.s.i.) Dry | Lap-shear (p.s.i.) Steamed | Peel (p.l.i.) Dry | Peel (p.l.i.) Steamed |
|---|---|---|---|---|---|---|
| 15 | 1 | 50 | 1,165 | 855 | 11 | 7 |
| 16 | 1 | 57 | 1,010 | 455 | 12 | 7 |
| 17 | 1 | 67 | 1,735 | 1,035 | 18 | 8 |
| 18 | 1 | 74 | 1,770 | 1,610 | 22 | 8 |
| 19 | 1 | 87 | 2,390 | 2,035 | 13 | 20 |
| 20 | 1 | 91 | 2,180 | 2,035 | 12 | 25 |
| 21 | 1 | 95 | 2,910 | 2,270 | 14 | 18 |
| 22 | 1 | b 90 | | | 10 | |
| 23 | 1 | c 50 | | | 8 | |
| 24 | 1 | c 80 | | | 6 | |
| 25 | (d) | 80 | | | 29 | |
| 26 | (e) | 80 | | | 29 | |
| 27 | 2 | 25 | | | 2 | |
| 28 | 2 | 50 | | | 17 | |
| 29 | 3 | 70 | | | 22 | |
| 30 | 4 | 90 | | | 30 | |
| 31 | 4 | 95 | | | 22 | |
| 32 | 6 | 70 | | | 14 | |
| 33 | 7 | 70 | | | 14 | |
| 34 | 8 | 50 | | | 9 | 7 |
| 35 | 9 | 70 | | | 23 | |
| 36 | 9 | 60 | | | 18 | |
| 37 | 10 | 90 | | | 19 | |
| 38 | 10 | 60 | | | 16 | |
| 39 | 11 | 98 | | | 14 | |
| 40 | 11 | 96 | 2,260 | | 16 | |
| 41 | 11 | 60 | | | 10 | |
| 42 | 12 | 90 | 2,475 | | 20 | |
| 43 | 13 | 95 | 2,485 | | 22 | |
| 44 | 13 | 90 | 2,510 | | 24 | |
| 45 | 14 | 90 | | | 27 | |
| 46 | (f) | 80 | | | 24 | |
| 47 | (g) | 95 | | | 17 | | a Hydrolyzed copolymer is that of Example 1 except where indicated as otherwise.
b 99% hydrolyzed copolymer as in Example 1 but melt index of 140.
c 99% hydrolyzed copolymer with melt index of 2 prepared from ethylene/vinyl acetate copolymer initially containing 6 mole percent vinyl acetate.
d Isotactic polypropylene with melt index (230° C., 3,800 g.) of 6.
e Isotactic polypropylene with melt index (230° C., 3,800 g.) of 15.
f Amorphous polypropylene with melt index (230° C., 3,800 g.) of 8.
g Combination of polymerized straight chain hydrocarbon resins in which considerable cyclic but no aromatic groups are present having a melt viscosity of 3 poise at 200° C. ("Piccopole" H-2).

We claim:
1. A composition consisting essentially of (A) 1–50 weight percent of a polymeric hydrocarbon resin having a melt index of less than 1000, said polymeric hydrocarbon resin being selected from the group consisting of polyethylene, amorphous polypropylene, ethylene/alpha-mono-olefin copolymers, ethylene/alpha-mono-olefin/diene terpolymers, polystyrene, and polyterpene, and (B) 50–99 weight percent of at least a 60 percent hydrolyzed ethylene/vinyl ester copolymer containing, prior to hydrolysis, 5–25 mole percent copolymerized vinyl ester and 75–95 mole percent copolymerized ethylene.
2. The composition of claim 1 wherein the vinyl ester is vinyl acetate.
3. The composition of claim 2 wherein the ethylene/vinyl acetate copolymer is hydrolyzed to at least about 75 percent.
4. The composition of claim 3 wherein the ethylene/vinyl acetate copolymer contains, prior to hydrolysis, 12–25 mole percent copolymerized vinyl acetate.
5. The composition of claim 4 wherein the ethylene/vinyl acetate copolymer is substantially completely hydrolyzed.
6. The composition of claim 5 wherein the ethylene/vinyl acetate copolymer contains, prior to hydrolysis, 16.5–19 mole percent copolymerized vinyl acetate.
7. The composition of claim 6 wherein (A) is present in an amount of 10–30 weight percent and (B) is present in an amount of 70–90 weight percent.
8. An article comprising at least two surfaces adhesively bonded together with the composition of claim 1.
9. The article of claim 8 wherein the two surfaces adhesively bonded are metal.
10. An article comprising at least two metal surfaces adhesively bonded together with the composition of claim 7.

References Cited

UNITED STATES PATENTS

| | | | |
|---|---|---|---|
| 3,248,359 | 4/1966 | Maloney | 260—41 |
| 3,226,455 | 12/1965 | Matsubayashieta | 260—897 |
| 2,419,880 | 4/1947 | Blyler et al. | 260—89 |
| 2,386,347 | 2/1945 | Roland | 260—86 |

FOREIGN PATENTS

| | | | |
|---|---|---|---|
| 582,093 | 11/1946 | Great Britain | 260—897 |

MURRAY TILLMAN, Primary Examiner

C. J. SECCURO, Assistant Examiner

U.S. Cl. X.R.

156—334; 161—216, 251; 260—888